Jan. 13, 1931.    J. G. BEACH    1,788,655
MEANS FOR ADJUSTING STOP APERTURE OF CAMERAS RELATIVELY TO DISTANCE
Filed Aug. 6, 1927
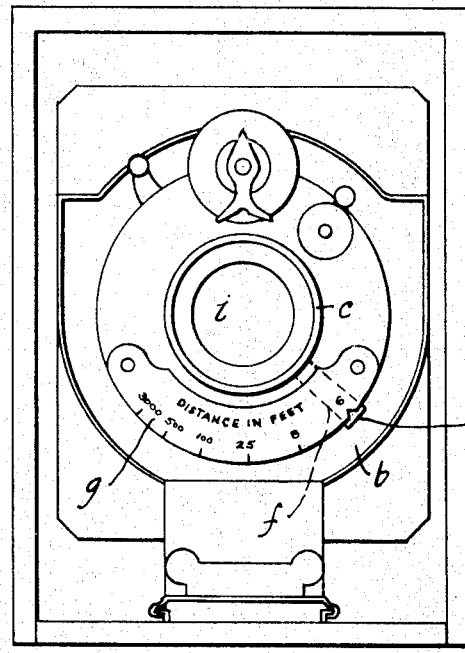
Fig. 1.
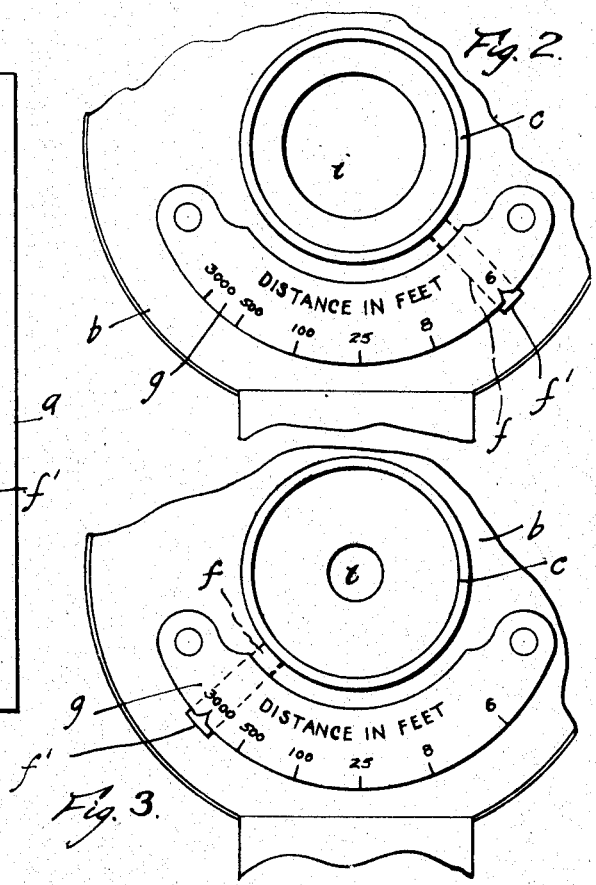
Fig. 2.
Fig. 3.
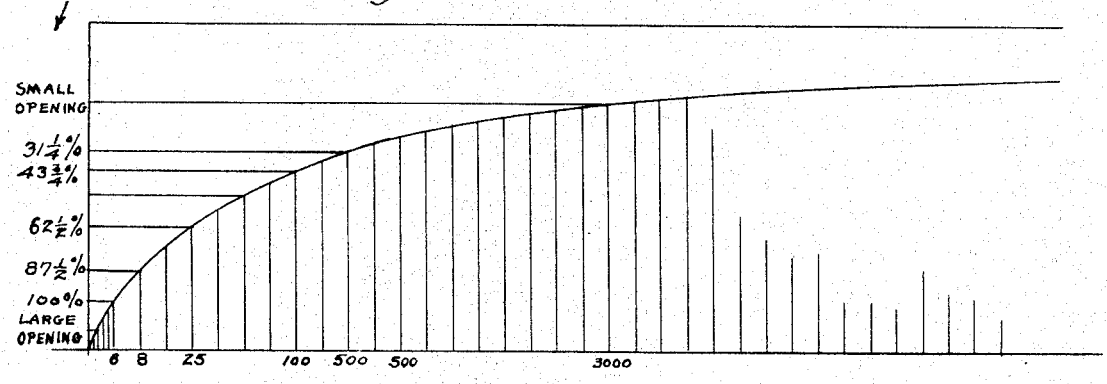
Fig. 4.
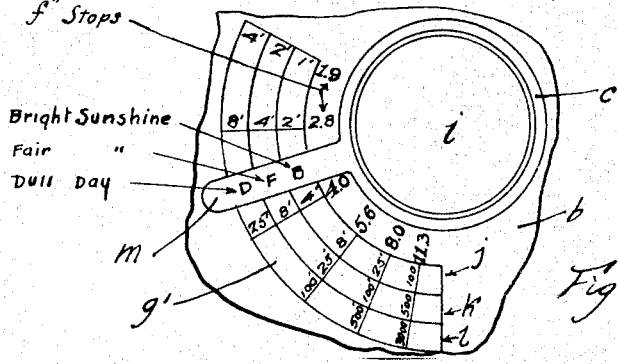
Fig. 5.
Inventor:
James George Beach
by J. J. Geisler
Atty Patented Jan. 13, 1931

1,788,655

UNITED STATES PATENT OFFICE

JAMES GEORGE BEACH, OF PORTLAND, OREGON

MEANS FOR ADJUSTING STOP APERTURE OF CAMERAS RELATIVELY TO DISTANCE

Application filed August 6, 1927. Serial No. 211,113.

My invention relates particularly to photographic cameras now generally used for instantaneous exposures.

The object of my invention is to provide a simple and definite method and means for determining the proper size of the stop aperture of the lens to be used when photographing objects, in order to obtain a good picture and preserve a uniformity of exposure for all subjects under the same lighting conditions.

It is known that there is a relation between the distance of the object to be photographed from the camera lens, and the required size of stop aperture, and means have been provided for adjusting the size of the stop aperture automatically with the movement of the lens frame in adjusting the focal range. But since the focal range has only a short range, for example, a hundred feet, when the object is located a greater distance away, this adjustment would require a variable exposure range. It was assumed that this relation was more or less dependent upon the subject to be photographed, and the exposure. Therefore it has heretofore been the custom to determine the size of the stop aperture by referring to a published "group of subjects", each group being marked with a recommended size of stop aperture to be used in taking the picture; the photographer then selecting the group in which his particular subject belongs, and using the stop aperture recommended.
I have discovered that a definite relation exists between the size of stop aperture required to be used and the distance from the camera lens to the object to be photographed; and that this co-relation is independent of the focus of the lens, and exists for any lens, and for any speed of lens.

Thus, for a lens of given speed the size of the stop aperture should be reduced proportionally to the distance of the object from the lens, and this distance should be approximately determined by the photographer, with reference to a scale provided for that purpose on the camera and the proper stop opening obtained automatically by properly positioning an indicator of said scale.

To this end my invention consists in providing in a camera, in combination with a stop adjustable to vary the opening thereof, a lineal scale representing the variable distance from the camera lens to the object to be photographed, an indicator movable over said scale and an operating connection from such pointer to the adjusting element of the said stop, whereby in positioning the indicator to the approximate distance of the object from the lens, the greater the distance the smaller proportionately will be the opening of said stop, substantially as described. And preferably the lineal scale is made up of a series of lineal scales, one to be used in place of the other in positioning the indicator of the scale under certain lighting conditions. By this mode and means of determining the size of the stop aperture the taking of pictures is greatly simplified; because the adjustment of the stop aperture becomes definite; thus eliminating uncertainty in photography, and also eliminating the tedious task of having to determine the adjustment of the stop aperture with reference to instructions covering the particular group of subjects. In short, my invention permits all pictures to be made with the same exposure, for example with good lighting conditions, a "snap shot"—no matter what distance the subject is from the lens, and no matter what the subject, provided the other exposure-influencing conditions are uniform.

In the accompanying drawings, forming a part of this specification, Fig. 1 represents diagrammatically the front view of a camera.

Fig. 2 and Fig. 3 are fragmentary views of the lens frame of the camera showing particularly that part which holds the stop and showing the aperture arranged for two different distances and the means to adjust it in accordance with my invention.

Fig. 4 is a graph illustrating the required adjustment of the stop-aperture relatively to given distances of the object from the lens; and Fig. 5 represents the scale element as consisting of a series of registering scales, one or the other of which is to be used in positioning the indicator in order to allow for variations in lighting conditions.

The type of camera shown represents the Premo. Since my invention deals only with the stop, and the adjustment of its aperture, those parts will be alone described in detail, and the other details will be assumed to be constructed as usual.

Thus, the camera $a$ is provided with a conventional lens-holding frame $b$, and the latter includes the stop-element $c$ of the well known "iris" type, which includes a member or arm $f$, by the movement of which the size of the stop-aperture $i$ is adjusted. Below the stop-aperture, on the front face of the lens-holder, is provided a scale $g$, representing lineal measurements of the variable distance of the object to be photographed from the lens of the camera.

It is sufficient that the scale represent points indicating arbitrary distances. The arm $f$ is provided with a pointer or indicator $f'$, which works over the scale $g$.

I have discovered that the size of the aperture of the lens stop must be reduced in correspondence with the increase of the distance between the object and the lens in the following proportions:—

For example using a $f$–3.5 lens and having a full open stop for an object 6 feet away from the lens, then the stop sizes would be as follows:

For a distance of 6 feet, the stop would be 100% of its full diameter
For a distance of 8 feet, the stop would be 87½% of its full diameter
For a distance of 25 feet, the stop would be 62½% of its full diameter
For a distance of 100 feet, the stop would be 43¾% of its full diameter
For a distance of 500 feet, the stop would be 31¼% of its full diameter
For a distance of 3000 feet, the stop would be 21⅞% of its full diameter
For a distance of 20000 feet, the stop would be 15⅝% of its full diameter and for other distances the percentages would be intermediate the amounts given.

A second example using a $f$–4.5 lens and having a full open stop for an object 6 feet away from the lens, then the stop sizes would be as follows:

For a distance of 6 feet, the stop would be 100% of its full diameter
For a distance of 8 feet, the stop would be 80% of its full diameter
For a distance of 25 feet, the stop would be 56% of its full diameter
For a distance of 100 feet, the stop would be 40% of its full diameter
For a distance of 500 feet, the stop would be 28% of its full diameter
For a distance of 3000 feet, the stop would be 20% of its full diameter For other distances the percentages would be intermediate and for snap shot work the stop size of 20% of the full diameter would remain the same size for all distances over 3000 feet.

A third example using a $f$–6.3 lens and having the full open stop for an object 6 feet away from the lens, then the stop sizes would be as follows:

For a distance of 6 feet, the stop would be 100% of its full diameter
For a distance of 8 feet, the stop would be 78¾% of its full diameter
For a distance of 25 feet, the stop would be 55¾% of its full diameter
For a distance of 100 feet, the stop would be 39⅜% of its full diameter
For a distance of 500 feet, the stop would be 27⅞% of its full diameter For other distances the percentages would be intermediate, and for snap shot work the stop size of 27⅞% of the full diameter would remain the same size for all distances over 500 feet.

A fourth example using a $f$–8.0 lens and having the full open stop for an object 8 feet away from the lens, then the stop sizes would be as follows:

For a distance of 8 feet, the stop would be 100% of its full diameter
For a distance of 25 feet, the stop would be 70¾% of its full diameter
For a distance of 100 feet, the stop would be 50% of its full diameter
For a distance of 500 feet, the stop would be 35⅜% of its full diameter For other distances the percentages would be intermediate the amounts given and for snap shot work the stop size of 35⅜% of the full diameter would remain the same size for all distances over 500 feet.

These percentages give sufficient data for the marking of distance scales for the 4 lenses in common use. The distances to the object which correspond to sizes of apertures as here indicated, or as applicable to other lenses, or to other adjustments of stop sizes to distances as may be taken to meet any required exposure, may be varied and yet retain a uniformity of exposure for all pictures and still have an effective exposure which would yield a good print, this allowable variation being due to the latitude of exposure allowable when using the present day plates or films.

The stop adjustments above given are to be understood as those to be used under good lighting conditions, for example bright sunlight, but under poor lighting conditions, for example dull days, the stop aperture could be moved to the next larger size, thus avoiding the making of a longer exposure.

The foregoing adjustments of the stop apertures relatively to the given distances is graphically represented by Fig. 4 of the drawing.

A multiple scale $g'$ could be employed, as illustrated by Fig. 5, also such scale may be composed of three concentric elements $j$, $k$, $l$ over which the arm $m$ is operated to adjust the stop aperture $i$, as to distance, but at the same time with reference to prevailing lighting conditions. By means of this scale a constant exposure could be used for any subject at any distance and for any intensity of lighting; this by having the different distances necessary recorded thereon and so arranged that when the stop indicator (which has recorded upon it the different intensities of lighting being used) is moved to the distance mark upon the scale which is opposite the intensity of the lighting being used, the stop to give a constant exposure will be automatically set; this constant exposure under all conditions being a necessity for "movie" or "cinema" cameras and could also be used to great advantage upon the regular instantaneous type of camera.

To operate the camera when equipped with this means of stop size adjustment, place the stop adjuster $f'$ of Fig. 1, at point showing distance to the object. This will give the correct stop to use for the picture.

A few examples are here given to illustrate the simplicity of exposure manipulations upon the camera and to show the resulting uniform system of exposure, when using, for example, a $f$–3.5 lens, films, and considering the subjects as average in color tone, lighting a midday summer sunshine and using this means of stop size regulation.

(a)

A portrait, distance 6 feet.
Set the camera focus at 6 feet.
Set the stop indicator $f'$ at 6 feet.
The exposure will be 1/100 second.

(b)

A group of people, distance 25 feet.
Set the camera focus at 25 feet.
Set the stop indicator $f'$ at 25 feet.
The exposure will be 1/100 second.

(c)

A street scene, principal object 50 feet away.
Set the camera focus at 50 feet.
Set the stop indicator $f'$ at 50 feet.
The exposure will be 1/100 second.

(d)

A view of the city, distance about 1 mile.
Set the camera focus at infinity.
Set the stop indicator $f'$ at 5000 feet.
The exposure will be 1/100 second.

I claim:

1. In a camera in combination with a stop adjustable to vary the size of the opening thereof, a lineal scale representing the variable distance from the camera lens to the object to be photographed and extended and graduated for distances beyond the infinity focus position of the lens, an indicator movable independently of the focusing mechanism, over said scale and an operating connection from such pointer to the adjusting element of the said stop, whereby in positioning the indicator to the approximate distance of the object from the lens, the greater the distance the smaller proportionately will be the opening of said stop, substantially as described.

2. In a camera in combination with a stop adjustable to vary the size of the opening thereof, a series of registering lineal scales representing the variable distance from the camera lens to the object to be photographed, an indicator movable over said scales and an operating connection from such pointer to the adjusting element of the said stop, whereby in positioning the indicator to the approximate distance of the object from the lens, the greater the distance the smaller proportionately will be the opening of said stop, substantially as described, and said scales representing respectively, variation to be made in the positioning of said indicator under certain lighting conditions.

JAMES GEORGE BEACH.